United States Patent Office 3,442,849
Patented May 6, 1969

3,442,849
EPOXY RESIN COMPOSITION AND PROCESS
FOR PREPARING SAME
Irving Tashlick, Rockaway, William H. Rutter, Succasunna, and William J. Zak, Wharton, N.J., assignors to Interpace Corporation, East Orange, N.J., a corporation of Delaware
No Drawing. Filed May 20, 1965, Ser. No. 457,486
Int. Cl. C08g 30/14, 51/04
U.S. Cl. 260—37                     2 Claims

ABSTRACT OF THE DISCLOSURE

A substantially anhydrous one-component epoxy resin composition which has superior shelf life and which can be made ready for use by addition of water. The essential components of the composition are an epoxy resin, a polyamine sulfate addition salt or a polyamine phosphate addition salt containing a maximum of four amino groups, and calcium oxide or barium oxide.

---

The present invention relates to, among other things, paints, coating compositions, adhesives, cements and grouts. More particularly, the present invention is concerned with substantially anhydrous liquid corrosion resistant epoxy resin compositions which will become functional when mixed with water or a water containing substance. The term "liquid" as used herein in connection with the epoxy resin compositions is intended to include a paste or paste-like epoxy resin composition, as well as semi-liquid or free-flowing liquid epoxy resin compositions.

The usefulness of epoxide resin compositions is widely recognized, the application in which epoxy resins are used being practically unlimited. In use, however, certain problems have arisen. For example, prior art epoxy adhesives, cements and grouts have presented numerous handling problems. Such compositions generally consist of an epoxy resin and an amine hardener. When an epoxy resin and an amine hardener are intimately mixed, however, they react and cross-linking and polymerization take place resulting in the desired chemical resistant product. Accordingly, to prevent intimate contact and reaction until actual use, it is necessary to pack and ship the epoxy resin and amine hardener separately.

Another disadvantage in prior art compositions is that the epoxy resin and amine hardener had to be measured accurately at time of use to obtain maximum cross-linking of the epoxy resin which is essential for optimum efficiency. This proved time consuming and inconvenient for the user.

A further disadvantage in prior art compositions is that the amine hardeners employed can be volatile with irritating and allergic actions. Extreme care is thus required in handling such amine hardeners.

There have been attempts to provide a dry unitary adhesive one-component epoxy resin composition in the sense that the composition can be made functional and ready for use by the addition of a liquid, the term "one-component" as used herein signifying compositions that can be shipped as one package and so used. The liquid apparently gives the composition fluidity and also activates it by setting free an amine hardener which in turn reacts with the epoxy resin to form the chemically resistant product. Such compositions have generally comprised an epoxy resin, an acid salt of an amino compound and a strong base. These unitary epoxy resin compositions have not been considered commercially feasible, however, because of a limited shelf life.

An object of the present invention is to provide unitary one-component anhydrous, liquid epoxy resin compositions which on the addition of water will become ready for use.

A further object of the present invention is to provide anhydrous, liquid epoxy resin compositions which avoid the need of multiple packaging and which require minimum handling problems for use.

An additional object of the present invention is to provide anhydrous, liquid epoxy resin compositions which avoid any need for accurate measurements of the ingredients of the composition at the time of ultimate use but yet allow for efficient action.

Yet another object of the present invention is to provide anhydrous, liquid epoxy resin compositions which are safe in the sense that they can be used without the danger of irritating and allergic actions to personnel handling the compositions.

A further object of the present invention is to provide anhydrous, liquid epoxy resin compositions that have an unexpectedly superior shelf life especially at low temperature, i.e., can be stored for a substantial period of time without substantial reaction, as compared with prior art dry, powdered epoxy resin compositions, but yet at the same time have excellent curing properties when water is added to the compositions.

Another object of the present invention is to provide anhydrous, liquid epoxy resin compositions which can be adequately cured with a wide range of water concentrations. The theoretical minimum amount of water that is normally required to activate the anhydrous liquid epoxy resin compositions of the present invention is that amount equal to the number of moles of calcium oxide in the formulation or the number of moles of water necessary to convert completely any substitute oxide in the formulation to the hydroxide. A practical quantity of water is about two-thirds the theoretical minimum. It is advisable to avoid the addition of excessive amounts of water in certain applications of the epoxy resin compositions of the present invention. Thus, for example, when the compositions are used for grouts, in order to prevent too much of a reduction in the viscosity of the compositions, three to five times the theoretical minimum of water is generally a maximum amount. On the other hand, in the preparation of free flowing paint systems no such maximum is advisable.

An additional object of the present invention is to provide a one-component epoxy resin formulation which may be stored in squeezable tubes or bottles.

A further object of the present invention is to provide a one-component anhydrous liquid epoxy resin formulation having high tensile strength and a high resistance to corrosion.

Other objects of the invention will appear as the specification proceeds.

According to the present invention, the foregoing objectives are accomplished by providing a substantially anhydrous, liquid blend of an epoxy resin, a phosphate or sulfate or equivalent acid addition salt of a polyamine, preferably a diamine, and solid barium oxide or calcium oxide, which blend on the addition of a water will become functional and ready for actual use.

Although it is not wished to restrict the reactions for curing of the epoxy resin composition described herein on addition of the water to any specific reaction mechanism, it is believed that when water is added to the anhydrous, liquid epoxy resin compositions, the water dissolves the amine salt and reacts with the calcium or barium oxide to form the corresponding base. The base in turn reacts with the polyamine salt to form another salt (salt of barium or calcium and the acid portion of the polyamine salt, e.g., calcium sulfate) and to set free the polyamine for further polymerizing and cross-linking the epoxy resin.

In addition to the foregoing essential components, other ingredients can be included in the compositions of the present invention. These include solvents and/or diluents, e.g. acetone, methylethylketone and tetrahydrofuran, for increasing the flow of the compositions as desired, plasticizers for controlling the percent elongation, dehydrating agents, such as silica gel, fillers, such as silica, titanium dioxide, Atomite (calcium carbonate), aluminum silicate, China clay, sodium silica aluminate, calcium silicate and wetting agents that are non-reactive with the epoxy resins. Such wetting agents include alkyl aryl ethers, e.g., Triton X–100, the corresponding alkyl ethers and alkyl esters.

Solvents and diluents may also be used as extenders thus allowing high filler ratios. They also can be used as components which induce the system to self-cure, their evaporation forming a water condensate enabling the oxide to liberate the amine for cross-linking and further polymerization of the epoxy resin component.

Any type of liquid or solid epoxy resin, the latter in conjunction with a substantially anhydrous solvent, which are curable at room temperature by polyamines can be used in formulating the compositions of the present invention. Applicable epoxy resins include the novolak epoxies and the condensates of bisphenol A and epichlorohydrin. Examples of epoxy resins, among others, are Shell Epon 828 and Dow DER 332 which are reaction products of epichlorohydrin with bisphenol A, Shell Epon 815 which is epichlorohydrin-bisphenol A resin diluted with reactive epoxide, Shell Epon 562 which is an aliphatic epoxy resin and Koppers Kopax 159 which is a liquid resorcinol diglycidyl ether type resin.

water) of the epoxy resin, amine salt and metal oxide and grinding or mechanically mixing the resultant substantially anhydrous composition, such as on a three roll paint mill, the liquid consistency of the compositions resulting from the liquid epoxy resin and/or the liquid extenders, diluents and the like. The amounts of components are not critical, however, less than equivalent amounts producing operable compositions.

The compositions of the present invention have a wide utility. In addition to their general use as a substitute for commercially available adhesives, cements and grouts, the compositions find specific use as adhesives for ceramic tile, topping for concrete floors, cement for bricks, linings for tanks, vats, towers and pipe, patching material for concrete structures, paint for wood and metal, and coatings for concrete art.

The following examples are given to aid in understanding the present invention. It is to be understood that the invention is not to be restricted to the specific compositions or conditions of application given in the examples. Rather, the following examples are illustrative only and should not be construed as limiting the present invention which is properly delineated in the appended claims.

EXAMPLE 1

A series of amine salts were prepared by weighing into a flask containing methyl alcohol a fixed quantity of amine. The flask was then cooled and a fixed amount of acid slowly added to the amine-methyl alcohol mixture while stirring constantly. The precipitate was filtered, washed with methyl alcohol and dried. The weights of acid and amines used to produce the amine salts were as follows:

| Amine Salt | Weight Amine | Weight Acid |
| --- | --- | --- |
| Ethylene diamine sulfate | 60 gm. ethylene diamine | 102 gm. 96% sulfuric acid. |
| Ethylene diamine chloride | do | 198 gm. 37% hydrochloric acid. |
| Diethylene triamine sulfate | 103.2 gm. diethylene triamine | 153 gm. 96% sulfuric acid. |
| Diethylene triamine chloride | do | 296 gm. 37% hydrochloric acid. |
| Triethylene tetramine chloride | 146.2 gm. triethylene tetramine | 395 gm. 37% hydrochloric acid. |

Applicable polyamine salts include 1,3-diaminopropane monosulfate, m-xylenediamine monosulfate, diethylenetriamine monosulfate, 1,6-hexanediamine monosulfate, ethylenediamine monosulfate, ethylenediamine bisulfate, 1,3-diaminopropane bisulfate, diethylenetriamine bisulfate, and ethylenediamine·$2H_2PO_4$. In the following examples the terms "$SO_4$" and "sulfate" when used refer to the monosulfate salt and/or its preparation, the term "$HSO_4$" referring to the bisulfate salt and/or its preparation. The amines preferably have a maximum of four amino groupings. The sulfate and phosphate addition salts are preferred, the chloride salts being inferior.

The polyamine salts can be prepared in the usual manner by diluting the polyamine with methyl alcohol and placing the solution in an ice bath, the acid then added and the polyamine salt filtered off from the slightly acidic solution. The precipitated salt, after washing with methyl alcohol until the washings are at a near neutral pH, is then oven dried.

The compositions of the present invention are readily prepared by blending substantially equivalent amounts for the above postulated reaction mechanism (the reaction of epoxy resin, polyamine salt and metal oxide with Equivalent amounts of epoxy resin (Epon 828), the respective amine salt (see supra) and oxide or base, according to the following formulations, were milled over a 3-roll paint mill:

| Formula | Epon 828, g. | Amine Salt, g. | Base, g. |
| --- | --- | --- | --- |
| A | 190.0 | Diethylene triamine sulfate, 50.0 | Sodium hydroxide, 24.5. |
| B | 190.0 | do | Calcium oxide, 17.0. |
| C | 190.0 | Diethylene triamine chloride, 42.5 | Do. |
| D | 190.0 | Ethylene diamine sulfate, 39.5 | Calcium oxide, 14.0. |
| E | 190.0 | Ethylene diamine chloride, 33.3 | Do. |
| F | 190.0 | Triethylene tetramine chloride, 48.7 | Calcium oxide, 18.6. |

For stability studies, Brookfield viscosity measurements were made on each of the above formulations initially, and at fixed times, or intervals after the formulations were placed in sealed jars, with the following results:

| Formula | Initial, cps. | 10 days, cps. | 30 days, cps. | 60 days, cps. | 90 days, cps |
| --- | --- | --- | --- | --- | --- |
| A | Jelled 5 min. after milling | | | | |
| B | 26,500 | 96,000 | 81,000 | 73,000 | 93,000 |
| C | 56,000 | 250,000 | 1,220,000 | Jelled | |
| D | 19,300 | 43,750 | 46,500 | 41,000 | 44,000 |
| E | 29,000 | 80,000 | 102,000 | 157,000 | |
| F | 75,500 | [1] 520,000 | | | |

[1] After 6 days, jelled 13 days after milling.

Formulae B and D showed that the compositions of the present invention afford an excellent shelf life. On the other hand, Formulae A, C, E and F, in comparison, have a poor shelf life.

A cure study on the above formulations was made by mixing them with water and allowing the resultant mixes to set at room temperature. The weight of ingredients for the cure study were as follows:

| Formula: | Weight One Component, g. | Weight Calcium Oxide Present, g. | Weight Water, g. |
|---|---|---|---|
| A[1] | | | |
| B | 136.8 | 9.0 | 12.6 |
| C | 36.0 | 2.4 | 3.3 |
| D | 94.8 | 5.4 | 7.5 |
| E | 36.0 | 2.1 | 2.9 |
| F | 36.0 | 2.6 | 3.6 |

[1] Not prepared. Cured 5 min. after milling.

The following was the rate and degree of cure of the above formulations:

Formula:   Rate and degree of cure
A[1] ____ Clear
B    ____ Major portion cured in 24 hr.
C    ____ Not cured after 5 days.
D    ____ Completely cured in 15 min., very hot, foamed.
E    ____ Not cured after 5 days.
F    ____ Not cured after 5 days.

[1] Not prepared. Cured 5 min. after milling.

Formulae B and D according to the present invention readily cured. On the other hand Formulae C, E and F did not cure after five days.

EXAMPLE 2

A paste of ethylenediamine sulfate (from Example 1), calcium oxide and an epoxy resin according to the following formulations, were mechanically mixed and cooled at 75° F.:

| No. | Resin | G. Epoxy | G. EDA.SO$_4$ | G. CaO |
|---|---|---|---|---|
| 11 | Shell Epon 828 | 380 | 79.0 | 28.0 |
| 12 | Shell Epon 815 | 380 | 79.0 | 28.0 |
| 13 | Shell Epon 562 | 306 | 79.0 | 28.0 |
| 14 | Koppers Kopox 159 | 256 | 79.0 | 28.0 |
| 15 | Dow DER 332 | 352 | 79.0 | 28.0 |

On addition of water, the above formulations cured and exhibited a shelf life, as follows:

| Number: | Cure | Shelf Life Minimum at 110° F. |
|---|---|---|
| 11 | 3 hours | 6 weeks. |
| 12 | 1 hour | Do. |
| 13 | 5 minutes | Do. |
| 14 | 15 minutes | Do. |
| 15 | 24 hours | Do. |

EXAMPLE 3

In order to show the effect of various fillers on the rate and degree of cure, a formulation with a ratio of 190.0 g. of Epon 828, 39.9 grams of ethylenediamine sulfate (from Example 1) and 14.0 grams of calcium oxide was prepared. This was designated as one-component Formula D. With this formulation and with the fillers designated below, the following results were had:

| | #1 | #2 | #3 | #4 |
|---|---|---|---|---|
| One-component epoxy Formula D, g | 23.50 | 23.50 | 23.50 | 23.50 |
| Atomite, g | 25.25 | | | |
| ASP-400,[1] g | | 13.20 | | |
| China clay, g | | | 11.00 | |
| Wollastanite F-1,[2] g | | | | 12.70 |
| Water, g | 1.80 | 1.80 | 1.80 | 1.80 |
| Cure Solid, day | 1 | 1 | 1 | 1 |
| Barcol Hardness | 35 | 15 | 10 | 10-15 |

[1] ASP-400 is a white aluminum silicate manufactured by Phillips Minerals & Chemicals Corp.
[2] Wollastanite F-1 is a calcium silicate manufactured by Godfrey Cabot Corp.

Additional formulations were prepared, as follows:

| | #5 | #6 |
|---|---|---|
| One-component Formula D, g | 188.0 | 164.0 |
| Titanium dioxide, g | 46.0 | 40.2 |
| Atomite, g | 202.0 | 121.5 |
| Water, g | 14.4 | 12.5 |
| Percent filler | 55.0 | 47.8 |
| Trowelability | (1) | (2) |
| Cure | (3) | (3) |

[1] Not trowelable.
[2] Trowelable.
[3] Hard.

| | #7 | #8 | #9 | #10 |
|---|---|---|---|---|
| Masterbatch X[1], g | 72.0 | 55.0 | 36.6 | 36.0 |
| One-component Formula D, g | 9.0 | 17.5 | 26.7 | 27.5 |
| Atomite, g | 19.0 | 27.5 | 36.7 | 49.0 |
| Percent filler | 55.0 | 55.0 | 55.0 | 60.0 |
| Ratio TiO$_2$ to Atomite | 2-1 | 1-1 | 1-2 | 1-2.75 |

[1] Masterbatch X is a 1 to 1 by weight mixture of one-component Formula D and titanium dioxide which has been ground on a three roll mill.

Formulae 7, 8, 9 and 10, with the addition of 3.5 g. water, troweled easily and cured well.

EXAMPLE 4

The excellent tensile strength of the compositions of the present invention was shown by determining the tensile strength of some of the formulations taken at random from the above examples:

Formula:                    Tensile strength, p.s.i.
    No. 10 (from Ex. 3) _____ 2082
    B (from Ex. 1) _____ 2060
    C (from Ex. 1) _____ 539
    D (from Ex. 1) _____ 2147
    E (from Ex. 1) _____ 1490

Formulae B, D and 10, which are according to the present invention, exhibit a superior tensile strength as compared with formulae C and E.

EXAMPLE 5

The good cleanability of the compositions of the present invention with certain wetting agents was demonstrated by the addition of 10 percent by weight of Triton X-100 and water to grout formulation No. 6 (Example 3). The composition was mixed well and troweled to the surface of ceramic tile. Only a light scrubbing was needed, using a wet sponge, to clean the grout from the tile surface fifteen minutes after application.

EXAMPLE 6

As illustrative of a practical application of the compositions of the present invention, blend (a) was prepared by first milling between rollers the following:

Percent
Epoxy resin (Epon 828) _____ 38.0
Ethylene diamine sulfate (from Example 1) _____ 15.8
Calcium oxide _____ 6.7
Titanium oxide _____ 39.5

Next a blend was prepared by mixing the following:

Percent
Blend (a) _____ 36.0
Epon 828 _____ 13.7
Calcium carbonate _____ 39.0
Triton X-100 _____ 3.1
Flexibilizer—Mod Epox[1] _____ 8.0

[1] A triphenyl phosphite supplied by Monsanto Chemical Company.

The resulting blend was in paste form and had a shelf life stability of more than six months. When about to be used a a ceramic tile cement, it was mixed with water and applied with a trowel. The reaction with water formed a secure bond between the title backing and title and an excellent hard, white grout formed between the titles.

EXAMPLE 7

To show the applicability of a solvent as an extender, the following formulation was prepared:

Formula 16

| | |
|---|---:|
| Ethylenediamine sulfate + Epon 828 + calcium oxide (No. 11 of Example 2) | 54.6 |
| No. 2 mesh silica | 27.0 |
| No. 20 mesh silica | 179.0 |
| No. 60 mesh silica | 17.0 |
| No. 120 mesh silica | 45.0 |
| H$_2$O | 4.4 |
| Solvesso 100 extender [1] | 3.8 |

[1] A 98 percent aromatic solvent with an initial boiling point of 321° F. It is suplied by the Humble Oil and Refining Company.

The above Formula 16 cured in 24 hours at 73° F. To show the use of solvents as aids to atmospheric cure systems, the following formulations were prepared:

| | 17 | 18 | 19 |
|---|---|---|---|
| Ethylenediamine sulfate plus Epon 562 plus calcium oxide (No. 13 of Example 2) | 50.0 | 50.0 | 50.0 |
| Tetrahydrofuran | 5.0 | | |
| Acetone | | 5.0 | |
| Methylethylketone | | | 5.0 |
| H$_2$O | 4.8 | 4.8 | 4.8 |

Formulas 17, 18 and 19, all cured in 24 hours at 73° F.

EXAMPLE 8

To illustrate the wide applicability of various polyamine in the composition of the present invention, the following acid salts were prepared:

| Number | Amines | Gm. Amine | Gm. about SO$_4$ | 100% H$_2$SO$_4$ HSO$_4$ |
|---|---|---|---|---|
| 20 | 1,3-diaminopropane | 74.0 | 98.0 | 196.0 |
| 21 | M-xylylene diamine | 136.0 | 98.0 | 196.0 |
| 22 | Diethylene triamine | 103.0 | 147.0 | 294.0 |
| 23 | 1,6-hexane diamine | 116.2 | 98.0 | 196.0 |
| 24 | Ethylenediamine | 60.0 | 98.0 | 196.0 |

| Number | Amines | Gm. Amine | Gm. 100% H$_3$PO$_4$ |
|---|---|---|---|
| 25 | do | 60.0 | 196.0 |

| Number | Amines | Gm. Amine | Gm. 37% HCl |
|---|---|---|---|
| 26 | do | 60.0 | 196.0 |

With the above acid salts, the following compositions were prepared:

| | Amine Salt, Gms. | | Gms. Epon 828 | Gms. CaO | |
|---|---|---|---|---|---|
| Number | SO$_4$ Salt | HSO$_4$ Salt | | SO$_4$ | HSO$_4$ |
| 20 | 43.0 | 67.6 | 190 | 14.0 | 28.0 |
| 21 | 58.6 | | 190 | 14.0 | |
| 22 | 50.0 | 79.5 | 190 | 16.8 | 33.6 |
| 23 | 53.6 | | 190 | 14.0 | |
| 24 | 39.5 | 64.0 | 190 | 14.0 | 28.0 |
| 25 | 64 | | 190 | 42.0 | |
| 26 | 33.2 | | 190 | 14.0 | |

These preparations exhibited the following minimum shelf lives:

| Number | Amine Salt | Cure | Minimum Shelf Life (110°) |
|---|---|---|---|
| 20 | 1,3 diaminopropane.SO$_4$ | 3 hrs | 3 wks. |
| | .HSO$_4$ | 8 hrs | 3 wks. |
| 21 | M-xylylene diamine.SO$_4$ | 45 min | 3 wks. |
| 22 | Diethylene triamine.SO$_4$ | 24 hrs | 3 wks. |
| | .HSO$_4$ | 6 hrs | 3 wks. |
| 23 | 1,6-hexane diamine.SO$_4$ | 1 hr | 2 wks. |
| 24 | Ethylenediamine.SO$_4$ | 3 hrs | 2 wks. |
| | .HSO$_4$ | 45 min | 3 wks. |
| 25 | Ethylenediamine.2H$_2$PO$_4$ | 24 hrs | 2 wks. |
| 26 | Ethylenediamine.2HCl | 24 hrs | Less than 2 wks. |

EAXMPLE 9

A series of metal oxides were employed in the compositions of the present invention by blending and mechanically mixing the following:

| Number | Oxide | G. Oxide | G. Epon 828 | G. EDA.SO$_4$ (from Ex. 8) |
|---|---|---|---|---|
| 27 | PbO | 111.6 | 380.0 | 79.0 |
| 28 | SnO$_2$ | 37.6 | 380.0 | 79.0 |
| 29 | SnO | 67.4 | 380.0 | 79.0 |
| 30 | ZnO | 40.7 | 380.0 | 79.0 |
| 31 | MgO | 20.2 | 380.0 | 79.0 |
| 32 | BaO | 76.8 | 380.0 | 79.0 |
| 33 | CaO | 28.0 | 380.0 | 79.0 |

The following cure times and minimum shelf life were observed.

| Number | Oxide | Cure Time | Minimum Shelf Life at 110° F. |
|---|---|---|---|
| 27 | PbO | No cure | |
| 28 | CaO | 3 hrs | 7 wks. |
| 29 | BaO | 24 hrs | 7 wks. |
| 30 | MgO | No cure | |
| 31 | SnO | do | |
| 32 | SnO$_2$ | do | |
| 33 | ZnO | do | |

EXAMPLE 10

A paint formulation (Formula A) was prepared by mechanically mixing the following components:

| Components: | Parts |
|---|---:|
| Epon 828 | 44.83 |
| Ethylenediamine sulfate (from Example 1) | 13.97 |
| Calcium oxide | 4.89 |
| Titanium oxide | 17.95 |
| Mod. Epox [1] | 13.26 |
| Diacetone alcohol | 5.10 |
| Triton X–100 | Trace |

[1] Fifty percent of the Mod. Epox can be replaced with 3 M's Cardolite Brand Epoxy Resin Flexibilizer and Reactive Diluent NC–513 or Epoxy Resin Extender NX–3532.

In application, Formula A was diluted with water as follows:

| Formula A | 50 | 50 | 50 |
|---|---|---|---|
| Water | 4 | 6 | 8 |
| Formula A[1] | 50 | 50 | 50 |
| Water | 4 | 6 | 8 |
| Formula A[2] | 50 | 50 | 50 |
| Water | 4 | 6 | 8 |

[1] As Formula A but 50% NX–3532 substituted for 50% Mod. Epox.
[2] As Formula A but 50% NC–513 substituted for 50% Mod. Epox.

An induction time of at least 30 min. was allowed after the addition of water although it was found that the type of surface finish attainable will vary depending on the induction period. Thus the shorter the induction period, the flatter was the finish while the longer the induction period, the more the finish approached the semi-gloss to gloss finish. Each of the above formulations diluted with water as indicated above was applied as paint films in thicknesses greater than 7 mils to a solid cellular base. Excellent paint films were obtained. It was further found that after curing for 20 hours, little if any residue was picked up when the paint films were washed.

While there have been described herein certain embodiments of the invention, it will be obvious to those skilled in the art that modifications and changes may be made therein without departing from the essence of the invention. It is, therefore, to be understood that the exemplary embodiments are illustrative and not restrictive of the invention, the scope of which is defined in the following claims, and that all modifications that come within the meaning and range of equivalency of the claims and would be obvious to those skilled in the art, are intended to be included therein.

Also the terms and expressions which have been employed in the specification are used as terms of description and not of limitation, and there is no intention, in the use of such terms and expressions of excluding any equivalents of the features shown and described or portions thereof, since it is recognized that various modifications are possible within the scope of the invention claimed.

Having described the present invention in some detail, that which is sought to be protected is set forth in the following claims.

What is claimed is:

1. A substantially anhydrous, liquid composition having superior shelf life and comprising an epoxy resin, a polyamine phosphate addition salt, said polyamine salt having a maximum of four amino groupings, and barium oxide or calcium oxide, which composition will become functional on the addition of water.

2. A substantially anhydrous, liquid composition having superior shelf life and comprising an epoxy resin, a polyamine phosphate addition salt, said polyamine salt having a maximum of four amino groupings, a pigment and barium oxide or calcium oxide which composition will become functional on the addition of water.

References Cited

UNITED STATES PATENTS

| | | |
|---|---|---|
| 3,277,052 | 10/1966 | Thompson. |
| 3,275,587 | 9/1966 | Weller. |
| 3,018,262 | 1/1962 | Schroeder _____ 260—29.2 |
| 3,242,117 | 3/1966 | Cohen _____ 260—29.2 |

OTHER REFERENCES

Rubber World: 1965, Materials & Compounding Ingredients for Rubber & Plastics, p. 631.

MORRIS LIEBMAN, *Primary Examiner.*

H. H. FLETCHER, *Assistant Examiner.*

U.S. Cl. X.R.

260—30.4, 32.8, 33.2, 33.6, 47